United States Patent
Anson

(10) Patent No.: US 10,796,026 B2
(45) Date of Patent: Oct. 6, 2020

(54) PROCESS AND DETACHABLE DEVICE FOR USING AND MANAGING ENCRYPTION KEYS

(71) Applicant: WILDFI PTY LTD., Sydney (AU)

(72) Inventor: Mark Rodney Anson, Sydney (AU)

(73) Assignee: Wildfi Proprietary Limited, Darlington, Sydney (AU)

( * ) Notice: Subject to any disclaimer, the term of this patent is extended or adjusted under 35 U.S.C. 154(b) by 192 days.

(21) Appl. No.: 15/957,782

(22) Filed: Apr. 19, 2018

(65) Prior Publication Data

US 2018/0307870 A1  Oct. 25, 2018

Related U.S. Application Data

(60) Provisional application No. 62/489,569, filed on Apr. 25, 2017.

(51) Int. Cl.
| | |
|---|---|
| *G06F 12/14* | (2006.01) |
| *G06F 21/44* | (2013.01) |
| *G06F 21/79* | (2013.01) |
| *G08B 21/24* | (2006.01) |
| *G06F 21/88* | (2013.01) |
| *G06F 21/60* | (2013.01) |
| *H04W 4/80* | (2018.01) |
| *G08B 21/02* | (2006.01) |

(52) U.S. Cl.
CPC .......... *G06F 21/79* (2013.01); *G06F 12/1408* (2013.01); *G06F 21/602* (2013.01); *G06F 21/88* (2013.01); *G08B 21/24* (2013.01); *G06F 2221/2107* (2013.01); *G08B 21/0247* (2013.01); *H04W 4/80* (2018.02)

(58) Field of Classification Search
CPC ................. G06F 21/79; G06F 12/1408; G06F 2221/2107; G08B 21/24; H04W 4/80
USPC ........................................................ 713/193
See application file for complete search history.

(56) References Cited

U.S. PATENT DOCUMENTS

| | | | |
|---|---|---|---|
| 2009/0182931 A1* | 7/2009 | Gill ...................... | G06F 21/79 711/103 |
| 2009/0187772 A1* | 7/2009 | Lange .................. | G06F 21/10 713/193 |
| 2009/0207013 A1* | 8/2009 | Ayed .................. | G08B 13/1427 340/539.1 |
| 2013/0185562 A1* | 7/2013 | Kato ................... | H04L 9/0816 713/171 |
| 2015/0145650 A1* | 5/2015 | Levan ................ | G06Q 10/0833 340/10.1 |
| 2015/0154394 A1* | 6/2015 | Kapinos ............... | G06F 21/36 726/19 |
| 2016/0004646 A1* | 1/2016 | Maeda ................ | G06F 21/62 713/193 |
| 2016/0021117 A1* | 1/2016 | Harmon .............. | H04L 63/105 726/1 |
| 2016/0028713 A1* | 1/2016 | Chui .................... | G06F 21/35 726/4 |
| 2017/0054674 A1* | 2/2017 | Moffat ................ | H04L 9/0822 |

(Continued)

*Primary Examiner* — Haresh N Patel
(74) *Attorney, Agent, or Firm* — Rosenberg, Klein & Lee

(57) ABSTRACT

A data storage system comprising: a detachable data storage device; an alarm device; where the alarm device is connected to the detachable data storage device and where the alarm device is configured to initiate an alarm event if the alarm device is sufficiently far away from the detachable data storage device.

13 Claims, 4 Drawing Sheets

(56) References Cited

U.S. PATENT DOCUMENTS

2017/0264438 A1* 9/2017 Kirshenbaum ....... H04W 12/08
2017/0364713 A1* 12/2017 Speak ..................... G06F 21/31
2018/0307870 A1* 10/2018 Anson .................... G06F 21/79

* cited by examiner

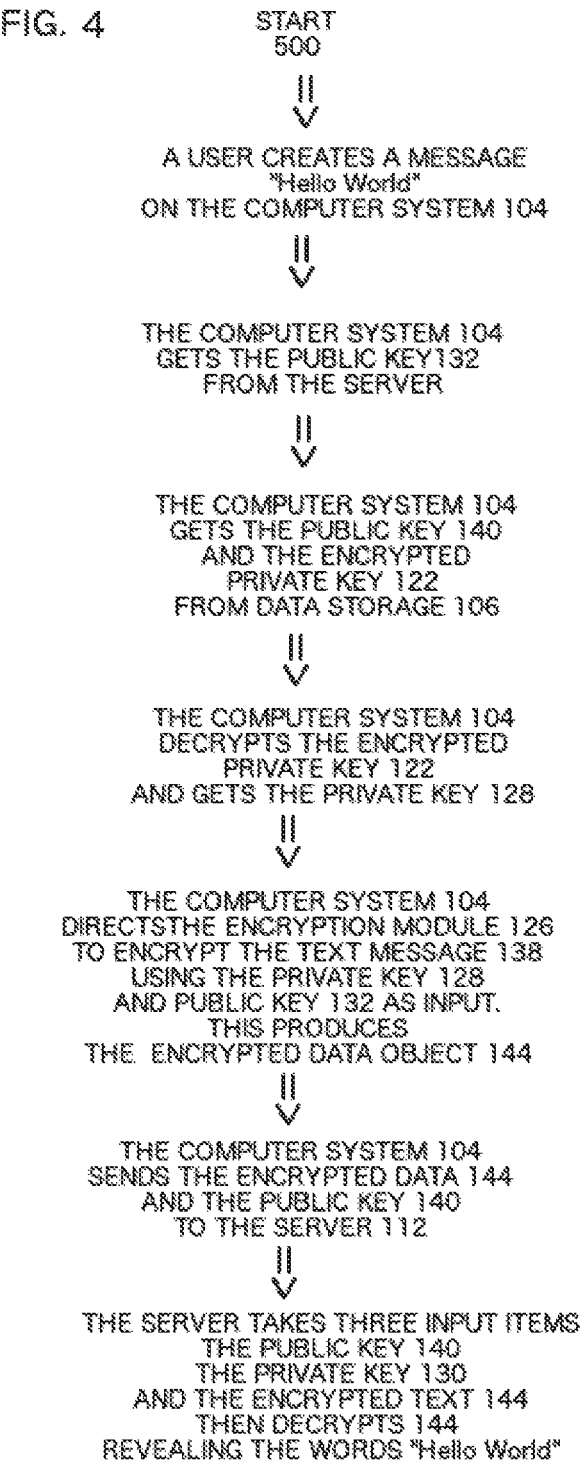

US 10,796,026 B2

PROCESS AND DETACHABLE DEVICE FOR USING AND MANAGING ENCRYPTION KEYS

CROSS-REFERENCE TO RELATED APPLICATIONS

Priority is claimed from U.S. Provisional Patent Application No. 62/489,569 entitled "A Process and Detachable Device for Using and Managing Encryption Keys" filed with the United States Patent and Trademark Office on Apr. 25, 2017, where Provisional Patent Application No. 62/489,569 is incorporated herein by reference as if recited below.

STATEMENT REGARDING FEDERALLY SPONSORED RESEARCH AND DEVELOPMENT

Not Applicable.

FIELD OF THE INVENTION

The present invention relates to the storage of secret keys used for encryption of data within computer systems and networks.

DISCUSSION OF RELATED ART

The advent of computer networks, including the internet, has made it possible for people to access and download information and files produced by millions of interconnected computers around the globe, as well as for the spread of spyware, computer viruses and malware amongst network connected computers. Sensitive information is difficult to keep confidential, particularly for businesses that have intellectual property which competitors could wish to obtain, even by illegal methods.

Data stored within computers can be easily copied and taken away from a business in a number of ways. Valuable information belonging to an organization can easily end up in wrong hands if adequate safeguards are not put in place. Public/private key cryptography and symmetric key cryptography enables individuals and businesses to share information and documents in a secure manner.

SUMMARY OF THE INVENTION

One aspect of invention provides a system that facilitates storing encryption keys on a detachable data storage device that can be connected to a computer system via a USB connection or any other suitable physical or wireless connection.

Encryption keys stored on a detachable device can be encrypted with a sufficiently long password known to an owner—a password that makes a brute force decryption attack on encrypted data infeasible. If a detachable data storage device is lost or stolen, then a person who gains possession of the detachable data storage device is not able to keys in an unencrypted form on the detachable data storage device since they do not know a proper password to decrypt the keys.

If a user connects a detachable data storage device to a computer and is engaged in a session of encrypted communications that can include encrypted document reviewing or editing and then if the user goes a sufficient distance away from the computer, an alarm device associated with the detachable data storage device can initiate an alarm event. In case of initiation of an alarm event, a detachable data storage device can be shut down and if necessary data contained on the device including a password key can be destroyed so that the data then becomes inaccessible to anyone who tries to access the data contained on the detachable data storage device.

According to one aspect of invention there is provided a data storage system comprising:
a detachable data storage device including a non-transient computer readable memory;
an alarm device;
where the alarm device is connected to the detachable data storage device and where the alarm device is configured to initiate an alarm event if the alarm device is sufficiently far away from the detachable data storage device.

According to one aspect of invention there is provided a method for storing data on a data storage system including a detachable data storage device having a non-transient computer readable memory and an alarm device connected to the detachable data storage device comprising a step of:
configuring the detachable data storage device and the alarm device so that an alarm event is initiated by the alarm device if the alarm device is sufficiently far away from the detachable data storage device.

According to one aspect of invention there is provided a data storage system comprising: detachable data storage means;
alarm means;
where the alarm means is associated with the detachable data storage means in such a way that the alarm means can initiate an alarm event if the alarm means is sufficiently far away from the detachable data storage means.

According to one aspect of invention there is provided a system that facilitates encryption and decryption of documents and messages sent to or received from a computer network and further provides a facility to enable a user to view or edit decrypted documents and to listen to decrypted sound data and video by means of screen and audio components of the system.

According to one aspect of invention there is provided a method for storing data on a detachable data storage device, including in one embodiment encryption keys, in such a way that if a user fails to ensure either: (a) intermittent login to an associated computer system or (b) either moves sufficiently far away from the detachable data storage device then the detachable data storage device can cease functioning, where cessation of function can include, in one or more embodiments, destruction of data, disablement or destruction of associated encryption modules, where the modules can include hardware or software.

DESCRIPTION OF THE DRAWINGS

FIG. 4 illustrates workflow involved in sending a message from a user's computer system to a network and then to a datacenter containing a server and database. When a message is received, the message is decrypted and an original plain text message is recreated in readable text.

DETAILED DESCRIPTION OF THE PREFERRED EMBODIMENT

Figure 1:
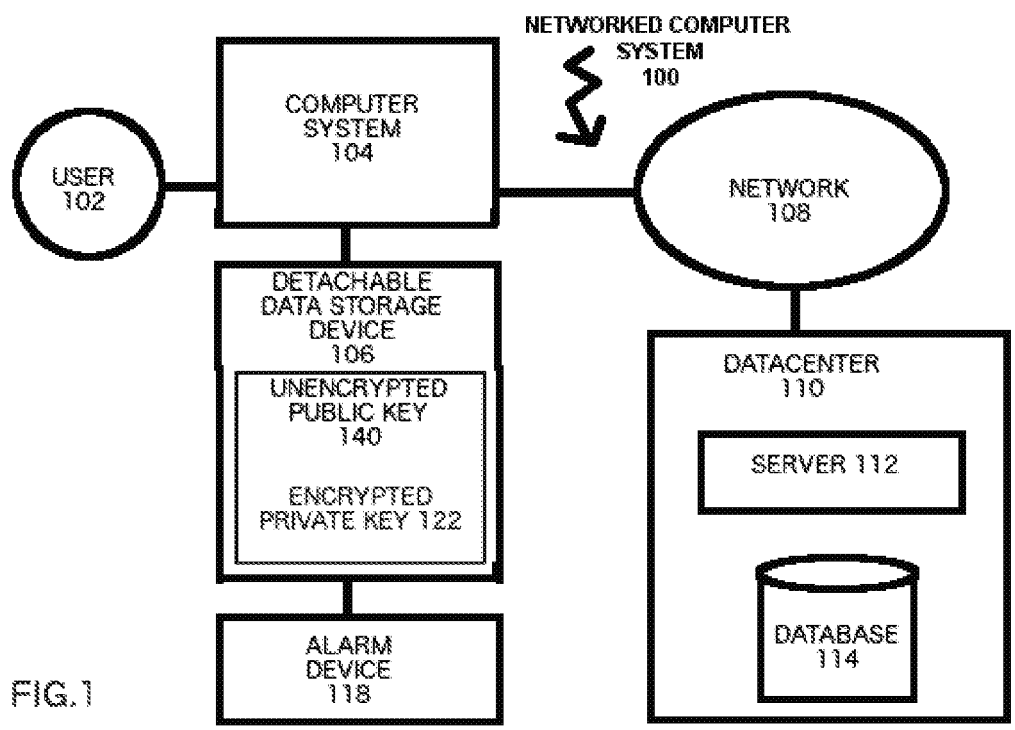
FIG. 1 illustrates a networked computer system in accordance with an embodiment of the present invention.

The following description is presented to enable any person skilled in the art of computer programming to make and use aspects of the invention and is provided in the context of a particular application and its requirements. General principles described here can be applied to other embodiments and applications without departing from the spirit and scope of aspects of invention. Thus, aspects of invention e not intended to be limited to embodiments shown and described but are to be accorded the widest possible scope consistent with principles and features disclosed herein.

Discussion in the Background and in the Description sections and any associated prosecution history pertaining to background art are not an admission against interest that the inventor's contribution resides in the background art.

Any reference to the expression "invention" in the specification and in any associated prosecution history is defined to mean a reference to preferred embodiments only and features recited in the preferred embodiments and associated drawings are not mandatory unless indicated by the associated context.

Embodiments of any invention are not limited to those recited in the Detailed Description but can include any suitable process/device/article of manufacture capable of performing an equivalent function.

The connection of two or more devices can be a physical connection, including a wire, a cable or another physical connection including without limitation a USB connection. Alternatively, a connection can be a wireless connection. Connections can be direct and also indirect. It is understood that a connection is for electronic or computer related purposes.

Keys stored on a non-transient computer readable memory can be symmetric or asymmetric. Asymmetric public keys are used to encrypt data and to verify electronic signatures. Asymmetric private keys, whilst having a capacity for encryption, are generally used to decrypt data and to provide electronic signatures.

Initiation of an alarm event can pertain to initiation of an alarm signal per se. Initiation of an alarm event by an alarm device can also include termination of operation of a data storage system or termination of operation of an associated encryption module where the encryption module can be located on a computer system or at any other location including location on a detachable data storage device associated with the alarm device or on the alarm device itself. Alternatively, in another embodiment initiating an alarm event can also include destruction of data, in whole or in part, on a data storage system or on an associated computer system or on networked computers or on other electronic systems. Initiating an alarm event can terminate operations associated with a detachable data storage device in a same way that initiating an alarm event associated with breach of security of physical premises is routinely associated with lockdown of the premises. Another situation can also occur in which if an alarm device remains within sufficient proximity to a computer system, while a detachable data storage device is moved sufficiently far away from the computer system then an alarm event can be initiated. Proximity to a computer system of either a detachable data storage device or an alarm device need not be required. All that can be required is a sufficiently large separation between an alarm device and a detachable data storage device in order to initiate an alarm event, irrespective of where the alarm device and the detachable data storage device are located. An alarm event be active in the sense of sending an alarm signal between an alarm device and a detachable data storage device. Alternatively, an alarm event can be triggered by a failure to send a signal between an alarm device and a detachable data storage device in a timely manner, which can occur when the alarm device and the detachable data storage device are out of communication range. The latter scenario is analogous to the raising of an alarm event when a security officer fails to report in to a security office in a timely manner, that is when reports from the officer are not sufficiently close together in time. In use, communication between an alarm device and a detachable data storage device will be spatially limited. Limited electromagnetic strength of electromagnetic waveforms used to transmit information between an alarm device and a detachable data storage device, limit the range over which communication between both devices is possible. Examples of limited range forms of communication that can be used in association with preferred embodiments include Bluetooth and limited range/low range WiFi.

A reference to "an" object or event in singular form includes plural forms unless a context indicates otherwise. For example, a reference to entry of "a password" can include entry of a plurality of passwords either substantially at one instant in time are at a plurality of different times. Similarly reference to "a key" can include a reference to a plurality of keys.

Any disjunctive expression including "or" in a context of "A or B", is used inclusively to denote element A, element B or both element A and element B unless a context indicates otherwise.

A password can include any form of indicia including without limitation alphanumeric indicia, biometric indicia and indicia derived from a swipe gesture, where the password is used to gain access to an electronic system.

Operations according to preferred embodiments can be implemented using: software, firmware, hardware or any other equivalent devices and processes. For example, a key can be encoded on a non-transient computer readable memory in either software or firmware format according to two embodiments. In another embodiment a key can be located on a detachable storage device by way of use of an electronic chip. Accordingly, a detachable data storage device can record data on a non-transient computer readable memory located on the device or on an electronic chip located on the device or on any other equivalent form of technology, where the other technology is configured to perform a same function in a same way.

Configuration of a device can include: (a) configuration using electronic instructions, including software or firmware, encoded on a non-transient computer readable memory associated with the device where the instructions are executed in association with a computer processor; (b) by way of configuration of an electronic circuit, including an electronic chip associated with the device, where the electronic circuit can, according to certain embodiments, be programmable. Configuration of a device by way of configuration of a non-transient computer readable memory or a circuit can include a case where the memory or the circuit are associated with the device but not located on the device, where association is by either physical connection or wireless connection. Altering the configuration of a system, where the system comprises a plurality of devices can include altering the configuration of some or all of the devices in the system.

An intermittent login means that a password must be entered into an electronic system from time to time either at periodic, regular, irregular intervals of time including in latter case at random intervals, but in all cases at sufficiently close intervals of time in order to maintain a login session.

A cryptography module or a key can alternatively be located: (a) on a computer system connected to a data storage system; (b) on a detachable data storage device; (c) on an alarm device associated with the detachable data storage device or (d) at a remote location on a network yet distant from the alarm device and the detachable data storage device and the computer system provided that in all instances of location the cryptography module is accessible for use in relation to the key.

Stating that two devices A and B are associated means that that device A is connected to device B either physically or by wireless for purposes including communication between devices A and B.

Actual position means position as specified by a grid, a map or other location identifying systems, devices or methods including a global positioning system.

FIG. 1 shows a preferred embodiment of a networked computer system 100 where a user 102 operates a computer system 104 that is connected to a network 108. User 102 can connect a detachable data storage device 106 to computer system 104 using a USB connector or another connection. Detachable data storage device 106 has an additional connection to an alarm device 118 which can connect to the device 106 using a Bluetooth connection or another connection that can be physical or wireless. In one embodiment, a physical connection, including a cord, can be used to terminate operation of device 106. For example, a tug on a cord connected to detachable data storage device 106 caused by a user 102 moving sufficiently far away from the detachable data storage device 106 can initiate an alarm event and also terminate operations associated with the detachable data storage device 106 in a similar way that initiating an alarm event associated with breach of security of physical premises is routinely associated with lockdown of the premises.

Data can be encrypted and decrypted by means of encryption keys and in a preferred embodiment all encryption keys and encrypted data can be stored on a non-transient computer readable memory located on a detachable data storage device 106, where the device 106 can be connected and disconnected from computer system 104. Detachable data storage device 106 can have an associated component called alarm device 118 that user 102 can keep in his/her pocket or bag. Alarm device 118 and detachable data storage device 106 can be in wireless contact according to one embodiment. If a wireless receiver belonging to detachable data storage device 106 stops receiving signals from a wireless transmitter belonging to alarm device 118, as can occur when user 102 with the alarm device 118 in his/her pocket goes a sufficient distance away from the detachable data storage device 106, where the device 106 contains his/her encryption keys and data, then the detachable data storage device the 106 can be configured to stop operating or delete data contained on the device 106. In any event even if an alarm event is not initiated, encryption of keys on a detachable data storage device 106 frustrates efforts to gain access to the keys in an unencrypted format. Additionally, alarm device 118 can create an alarm event including an alarm signal that user 102 can notice, where the signal can include a sound, vibration or emission of a flashing light. In this way, a data storage system can be configured so that computer system 104 can only have access to encryption keys and encrypted data on detachable data storage device 106 when a user 102 is sufficiently close to the computer system 104. An alarm event initiated by alarm device 118 can also be used to signal to user 102 imminent destruction of data stored on detachable data storage device 106 if the user 102 fails to return to sufficiently close proximity to the detachable device 106.

Figure 2:
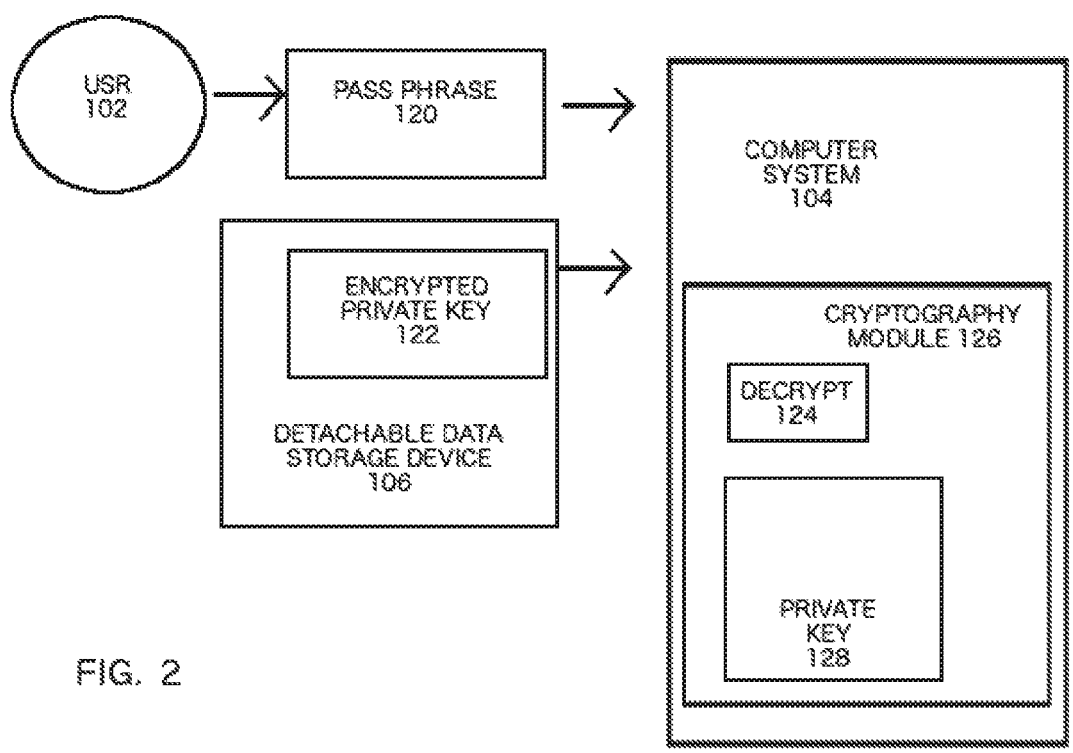
FIG. 2 illustrates a process of decrypting a secret encryption key stored within a detachable data storage device.

FIG. 2 shows a computer system 104 according to one preferred embodiment. In order to decrypt an encrypted key 122 located on a detachable data storage device 106, a user 102 can provide a password including in one or more embodiments: a pass phrase 120, a swipe gesture using touchscreen interface, or a password 120 using a keyboard, a mouse or any other device and process capable of use for password entry including without limitation an optical pointer associated with computer system 104. As mentioned above, password 120 can be in a form of text or other forms of input, including but not limited to a gesture entered via a swipe motion on a touchscreen, or user-identifying data derived from biometric data or a combination of latter forms of password entry. In one embodiment, a plurality of passwords can be required to be entered at a same time or at a plurality of different times and in a latter case at predetermined time intervals or at irregular intervals of time, including in one embodiment at random intervals of time in order to maintain an active session of communication with computer system 104, thus preventing loss of encrypted data on detachable data storage device 106 or on the computer system 104, where the data, including keys, could otherwise be destroyed in order to maintain security if an intermittent mode of authentication is not undertaken.

Computer system 104 can receive a user's password 120, including in one embodiment a phrase and send the password 120 to a cryptography module 126, together with a user's encrypted private key 122 that the computer system 104 retrieves from detachable data storage device 106. Cryptography module 126 can perform a decryption process using decryption module 124 that can output a user's unencrypted private key 128. Computer system 104 can then use unencrypted private key 128 to encrypt or decrypt files or data or for purposes of encrypting and decrypting messages sent to or from other computer systems. In another embodiment, cryptography module 126 can be located on detachable data storage device 106, thus facilitating complete destruction of all information or instructions stored on the device 106 in event of initiation of an alarm event by alarm device 118. As mentioned before, whilst a private key can encrypt data, the private key is generally only used for decryption or digital signing.

In one embodiment, computer system 104 can not only produce one unencrypted private key 128 when it initiates operation of decryption module 124 but additionally a plurality of other secret encryption keys can also be decrypted and become available for purposes of encrypting or decrypting files or messages. The decrypted keys can be symmetric or asymmetric keys including: AES-256 keys, RSA keys or Elliptic Curve keys. Computer system 104 can connect to a network 108 and to other computers accessing network 108 including server 112 located within a datacenter 110 as seen in FIG. 3.

Figure 3:
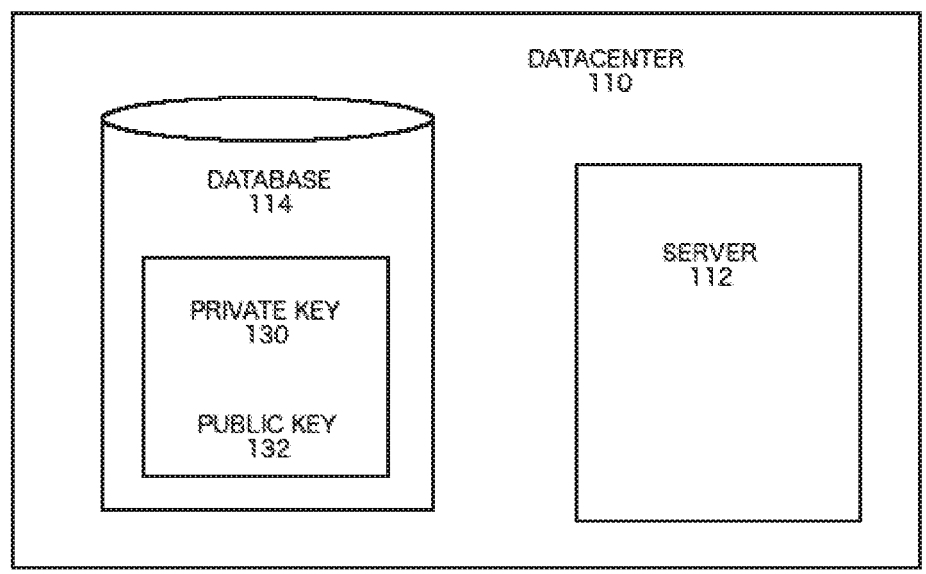
FIG. 3 illustrates a datacenter and associated server with which the computer system seen in FIG. 1 can communicate.

FIG. 3 shows a server 112 within a datacenter 110. Server 112 can connect to a database 114 that can contain an Elliptic Curve public/private key pair composed of a public key 132 and a private key 130. Public key 132 can be freely distributed to the public and is able to be freely downloaded by computer system 104 operated by user 102. After downloading public key 132 from server 112, computer system 104 can send or receive encrypted messages to or from the server 112 using any encryption system including an Elliptic Curve Integrated Encryption Scheme (ECIES).

FIG. 4 illustrates, in use, workflow involved in sending a message from a user's computer system 104 to a network 108 and then to a datacenter 110 containing a server 112 and database 114 as previously seen in FIG. 3. User 102 can start a process 500 of composing a message in plain text 138 containing words "Hello world" and send the message along with a previously obtained server public key 132 and a user's encrypted private key 122 to cryptography module 126. Using, in one embodiment, an Elliptic Curve Integrated Encryption Scheme, cryptography module 126 can create encrypted data object 144 that contains a "Hello world" message in encrypted form. Encryption being performed by public key 132 and unencrypted private key 128, the latter key, 128, being used for electronic signing and decryption purposes. Unencrypted private key 128 is obtained from encrypted private key 122 by use of cryptography module 126. Computer system 104 seen in FIG. 1 that control cryptography module 126 can then send encrypted data object 144 to server 112. Server 112 can then decrypt or authenticate encrypted data object 144 using server 112's unencrypted private key 130 for decryption and a user's public key 140, where the public key 140 that has previously been sent to the server 112, can be used for signature authentication purposes and also encryption purposes.

INDUSTRIAL APPLICABILITY

In one embodiment one or more detachable data storage devices 106 can be associated with one or more alarm devices 118.

In one embodiment a detachable data storage device 106 can be fixed in position when connected to a computer system 104, while an alarm device 118 can be permitted to move with a user 102, such as when the alarm device 118 is located in a user's pocket. Conversely, in one embodiment an alarm device 118 can be located at a fixed position, for example in a building, and a detachable data storage device 106 can be permitted to move with a user 102 from building to building, albeit over a permissible range. It is immaterial, in one embodiment, whether detachable data storage device 106 moves or whether alarm device 118 moves, all that is important is a relative separation between the detachable data storage device 106 and the alarm device 118.

In one embodiment actual position of detachable data storage device 106, from a global positioning system perspective, as opposed to relative position between the detachable data storage device 106 and alarm device 118, can be a relevant factor in that the detachable data storage device 106 or the alarm device 118 can be associated with a global position system, UPS, in such a way as to permit movement of the detachable data storage device 106 within specified areas of a secured location, where the alarm device 118 can either remain fixed in position or move. Movement of the detachable data storage device 106 outside of a prescribed location can lead to initiation of an alarm event by an alarm device 118, where the alarm device 118 is associated with a GPS system that can track movement of the detachable data storage device 106 or the alarm device 118. A UPS tracking system can physically separate, at least in part, to detachable data storage device 106, physically separate, at least in part, to the alarm device 118 or physically located in part on either of the detachable data storage device 106 or the alarm device 118.

In use, in order to extend signal coverage, a detachable data storage device 106 can be associated with a plurality of alarm devices 118 and based on the association, user 102 could then be permitted to travel within confines of a building, according to one embodiment, with the detachable data storage device 106. An absence of an alarm device 118 outside a building can mean that detachable data storage device 106 could cease to operate outside the building or lead to initiation of an alarm event if the detachable data storage device 106 crosses a permissible boundary. In other embodiments signals between a detachable data storage device 106 and an alarm device 118 can be routed around a prescribed location, including a building, by using routers in order to expand a domain of permissible use for the detachable data storage device 106. As noted above, an alarm device 118 can be permitted to move, while detachable data storage device 106 remains fixed. Accordingly, detachable data storage device 106 or alarm device 118 can move.

In one embodiment a detachable data storage device 106 can have a transmitter or a receiver. Similarly, in one embodiment an alarm device 118 can have a transmitter or a receiver.

By ensuring sufficient signal coverage, in one embodiment, alarm device 118 can be at a remote location, for example within a building in a secured location. Alarm device 118 can then control access to any detachable data storage device 106 within a secured location. Physical fences and guards can control access of personnel to a secured location and at least one alarm device 118 located at one or more locations within the secured location can shut down or destroy contents of one or more detachable data storage devices 106 located in one or more buildings within the secured location by way of initiation of an alarm event as required.

Any detachable data storage device 106 can also be authenticated or rejected based on unique identifying indicia located on the detachable data storage device 106 in either software, firmware or hardware format. Accordingly, attempts to use an unauthorized data storage device having incorrect or no identifying indicia within confines of a building can also be identified for purposes of initiating an alarm event. Furthermore, attempts to take an authorized detachable data storage device 106 outside confines of a building or more generally away from any secured location including a compound, can be recognized because signals received from the detachable data storage device 106 can be used to track the detachable data storage device 106, where tracking can include GPS tracking. Even if an attempt is made to turn a detachable data storage device 106 off for purposes of removing data contained on the detachable data storage device 106 from a secured location in an unauthorized manner, an act of turning the detachable data storage device 106 off can also be used to initiate an alarm event. Accordingly, use of at least one detachable data storage device 106 associated with at least one alarm device 118 can be used to minimize prospects of unauthorized removal of data from a secured location.

What is claimed is:
1. A data storage system comprising:
a detachable data storage device including data storage hardware, an encrypted key being stored on the detachable data storage device; and
an alarm device configured to communicate with the detachable data storage device;
where the data storage system is configured to operate in association with a cryptography module configured to decrypt the encrypted key, and where the alarm device is configured to initiate an alarm event if a separation distance between the alarm device and the detachable data storage device is determined to be at least a threshold distance, the alarm event including terminating operation of the cryptography module to thereby prevent decryption of the encrypted key.

2. The data storage system as recited in claim 1, where the data storage system is configured to operate in association with a password entered into a computer system connected to the data storage system, at least one data element which is stored in the data storage system being rendered accessible upon entry of the password.

3. The data storage system as recited in claim 2, where the data storage system is configured to derive the password from a swipe gesture.

4. The data storage system as recited in claim 2, where the data storage system is configured to require entry of the password into the computer system after each of a plurality of predetermined intervals.

5. The data storage system as recited in claim 2, where the data storage system is configured to require entry of the password into the computer system after each of a plurality of random and irregular intervals.

6. The data storage system as recited in claim 1, where identifying indicia are encoded on the detachable data storage device in one of a software, firmware, or hardware format, the alarm device being further configured to initiate an alarm event responsive to a lack of correct identifying indicia.

7. The data storage system as recited in claim 1, where the separation distance is determined by GPS tracking of at least one of the alarm device and the detachable data storage device.

8. The data storage system as recited in claim 1, where the encrypted key is a symmetric key.

9. The data storage system as recited in claim 1, where the encrypted key is an asymmetric key.

10. The data storage system recited in claim 1, where the alarm event further includes generating at least one of a sound, a vibration, and a flashing light.

11. The data storage system recited in claim 1, where the alarm event further includes deletion of at least one data element stored in the data storage system.

12. A method for storing data on a data storage system including a detachable data storage device and an alarm device configured to communicate with the detachable data storage device comprising:
   storing an encrypted key on the detachable data storage device;
   configuring a cryptography module to decrypt the encrypted key;
   initiating an alarm event by the alarm device if a separation distance between the alarm device and the detachable data storage device is determined to be at least a threshold distance, the alarm event including terminating operation of the cryptography module to thereby prevent decryption of the encrypted key.

13. A data storage system comprising:
   detachable data storage means; and
   alarm means configured to communicate with the detachable data storage means;
   where the data storage system is configured to operate in association with a password entered into a computer system connected to the data storage system, at least one data element which is stored in the data storage system being rendered accessible upon entry of the password, the data storage system being configured to require entry of the password into the computer system after each of a plurality of random and irregular intervals;
   where the alarm means can initiate an alarm event if a separation distance between the alarm means and the detachable data storage means is determined to be at least a threshold distance.

* * * * *